(12) United States Patent
Chakraborty

(10) Patent No.: US 9,510,288 B1
(45) Date of Patent: Nov. 29, 2016

(54) CONCURRENT, RECONFIGURABLE, LOW POWER HARMONIC WAKE-UP AND MAIN RADIO RECEIVER

(71) Applicant: Texas Instruments Incorporated, Dallas, TX (US)

(72) Inventor: Sudipto Chakraborty, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/819,966

(22) Filed: Aug. 6, 2015

(51) Int. Cl.
*H04L 27/06* (2006.01)
*H04W 52/02* (2009.01)

(52) U.S. Cl.
CPC ..... *H04W 52/0229* (2013.01); *H04W 52/0274* (2013.01)

(58) Field of Classification Search
CPC ............... H04W 52/0229; H04W 52/0274
See application file for complete search history.

(56) References Cited

U.S. PATENT DOCUMENTS

| | | | | |
|---|---|---|---|---|
| 7,142,838 B2 * | 11/2006 | Rotzoll | ............. | H04W 52/0229 455/343.2 |
| 9,300,351 B2 * | 3/2016 | Sharma | ............. | H04B 1/401 |
| 2003/0236077 A1 * | 12/2003 | Sivard | ............. | H04W 52/0229 455/127.1 |
| 2010/0040120 A1 * | 2/2010 | Sharma | ............. | H04W 52/0235 375/219 |
| 2011/0074552 A1 * | 3/2011 | Norair | ............. | G06K 7/0008 340/10.1 |
| 2014/0187186 A1 * | 7/2014 | Pursula | ............. | H04B 1/1615 455/227 |
| 2015/0188587 A1 * | 7/2015 | Imamura | ............. | H04W 52/0229 455/226.2 |

* cited by examiner

*Primary Examiner* — Kenneth Lam
(74) *Attorney, Agent, or Firm* — John R. Pessetto; Charles A. Brill; Frank D. Cimino

(57) ABSTRACT

A wireless receiver includes a receiver front-end where the input of the LNA and the mixer have separate main radio and wake-up modes, where same DC voltage is used at the input of the LNA, and the input of the baseband filter. When the receiver switches between the wake-up and main radio mode, wake-up current usage is reduced due to near zero latency in programming bias voltages from the power management unit. The receiving circuitry can one or both of selectively change a signal processing path for the receiving circuitry or selectively configure signal processing circuits of the receiving circuitry when switching between the wake-up mode configuration and the main radio mode configuration. The programming and configurations are dependent on the dynamic range and modulation techniques and requires near zero area overhead compared with the main radio receiver.

12 Claims, 6 Drawing Sheets

CONCURRENT, RECONFIGURABLE, LOW POWER HARMONIC WAKE-UP AND MAIN RADIO RECEIVER

TECHNICAL FIELD

This invention relates generally to radios and more particularly to circuits for waking up a radio from a low power mode.

BACKGROUND

Communication devices of various kinds rely on various circuitries to control different aspects of electronic communication between devices. With the rise of wireless communication devices such as mobile phones, smart phones, tablet computers, and other mobile devices that communicate wirelessly, power and battery efficiency have become a significant concern.

An example circuit schematic for a typical wireless receiver is illustrated in FIG. 1. An input 105 is configured to receive signals at an integrated circuit (IC) from an antenna 110 disposed on a printed circuit board (PCB). The input signal travels through a low noise amplifier core 134 and center-tapped transformer 136 to a mixer circuit 140. The mixer circuit 140 provides an output to baseband filters 160 (BBF) for blocker rejection, which provide filtered signals to analog to digital conversion circuits 165 that convert the analog output from the receiving circuitry to a digital signal for use by the receiving device associated with the antenna 110.

One way to conserve power in a wireless radio is to power down the circuitry of the radio (typically in what is called a low power mode) when the radio is not being used. A problem with this approach is that the radio needs to be a least periodically powered up to detect whether another device is trying to send a communication to the radio. However, this takes a long time to wake-up, thereby reducing battery longevity.

One approach to solving this problem is to include a separate lower power radio for detecting the incoming signal. This approach, however, requires more hardware built into the communication device, increasing the die area and the cost. Another approach is to configure the radio of the communication device to listen for the incoming communication, which approach costs more current and battery life. Moreover, with the increasing abilities of modern communication devices, there is pressure to have the radio wake-up process occur in a very fast wake-up time with low latency while also conserving battery life. At the same time, the wake up receiver shall maximally use the hardware already allocated for the main receiver.

SUMMARY

Generally speaking, and pursuant to these various embodiments, a wireless receiver includes a receiver mixer having separate main radio and wake-up modes, both using the same DC operating point (precisely the DC voltage). So configured, when the receiver switches between the wake-up and main radio mode, wake-up current usage is reduced because no switching of the DC operating point is required, and the long time constant associated with the power management unit is eliminated, leading to increased battery longevity. The circuitry can be arranged in a variety of ways to meet these operating constraints. For example, the receiving circuitry can one or both of selectively change a signal processing path for the receiving circuitry or selectively configure signal processing circuits of the receiving circuitry when switching between the wake-up mode configuration and the main radio mode configuration.

So configured, such a wireless receiver exhibits a fast wake-up time with a minimal amount of overhead in terms of hardware because it largely uses the main signal path, thereby using a minimum footprint on silicon. Versions of this approach involve reconfigurations of the main radio receiver architecture, so little additional power consumption is incurred. When using a same DC operating point between the main and the wake-up radio, the time to charge up bias paths in the receiving circuitry is minimized. Because the receiving circuitry architecture is efficiently arranged with the main radio optimized for data communication and a wake-up radio optimized for ASK/FSK type modulation, excellent sensitivity in both modes is achieved without compromising selectivity. Moreover, aspects of the described approaches can be used at any frequency band (ISM2P5G using 2.4-2.5 GHz band, sub1G bands typically using lower carrier frequencies than 1 GHz, and the like). These and other benefits may become clearer upon making a thorough review and study of the following detailed description.

BRIEF DESCRIPTION OF THE DRAWINGS

The above needs are at least partially met through provision of the concurrent, reconfigurable, low power harmonic wake-up and main radio receiver described in the following detailed description, particularly when studied in conjunction with the drawings wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
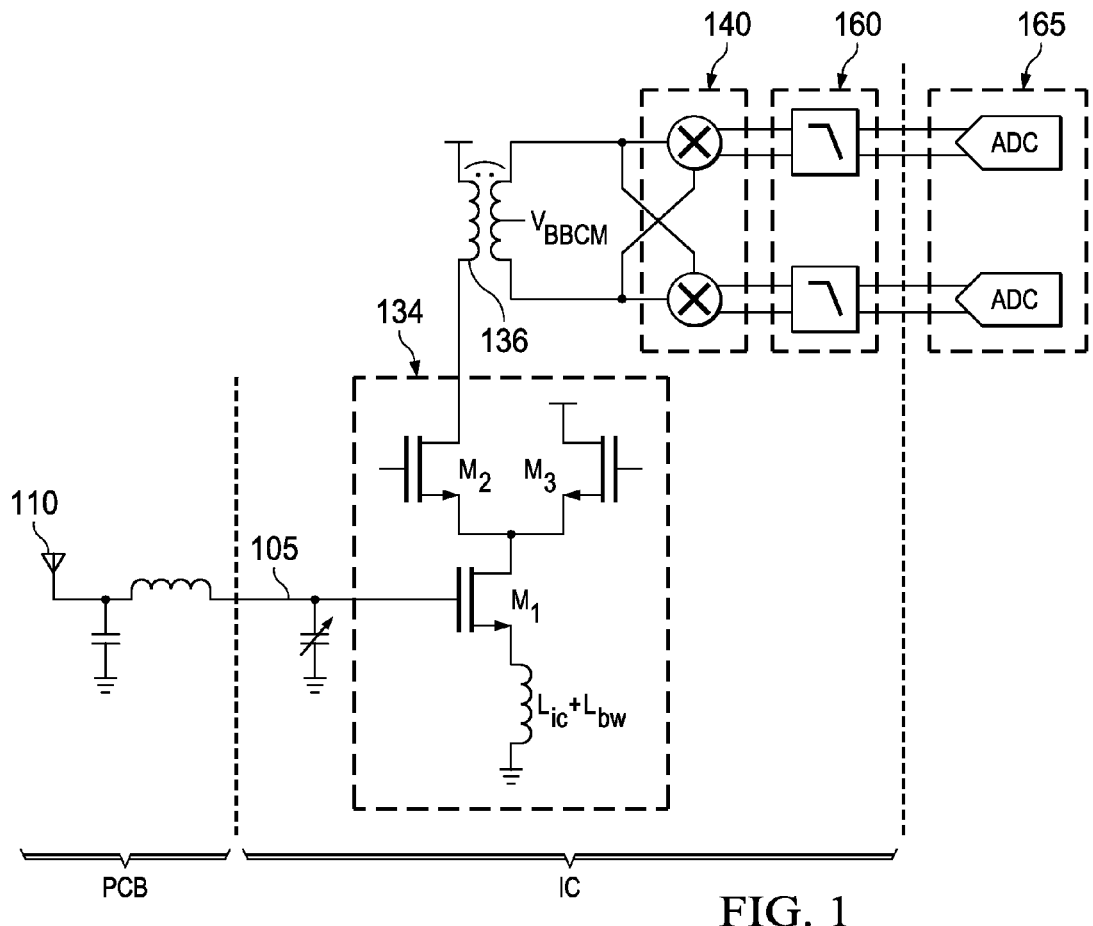
FIG. 1 comprises a circuit diagram of a prior art wireless receiver.
Figure 2:
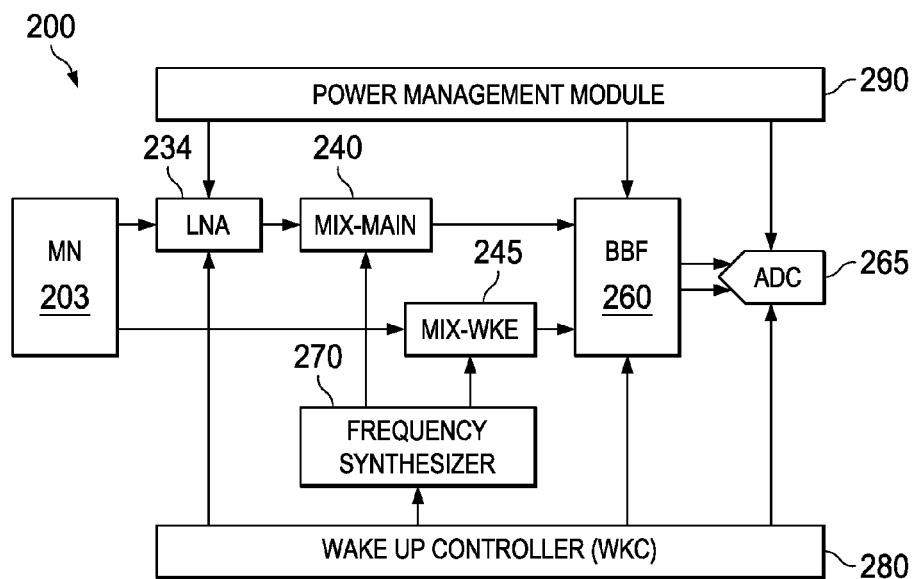
FIG. 2 comprises a block diagram of an example receiver mixer as configured in accordance with various embodiments of the invention.

Referring now to the drawings and, in particular, FIG. 2, a block diagram of an example of the overall apparatus 200 for a radio receiver will be described. The apparatus 200 includes a matching network 203 (MN), a low noise amplifier 234 (LNA), a mixer circuit 240 for a main signal path (Mix-main), a mixer circuit 245 for the wake-up receiver (Mix-WKE), a baseband filter 250 (BBF), and an analog to digital converter 265 (ADC). A frequency synthesizer 270 provides the center frequency for the radio frequency (RF) signal to be downconverted. These are standard blocks used for any RF communication.

A wake-up controller 280 (WKC) provides configuration control to various circuit blocks. The main aim is to accomplish wake up from the power down mode to the main receiver (maximum dynamic range) mode with smallest possible time constant. In the illustrated approach, the wake-up controller 280 does not configure the high time constant power management module 290 and does not configure the loop-bandwidth of the phase locked loop circuit (PLL) (not shown). The wake-up controller 280 may configure the baseband filter 260 by controlling switching it between operating in a current mode configuration or voltage mode configuration. The power management module 290 provides the voltage and currents to the various functional blocks.

Figure 3:
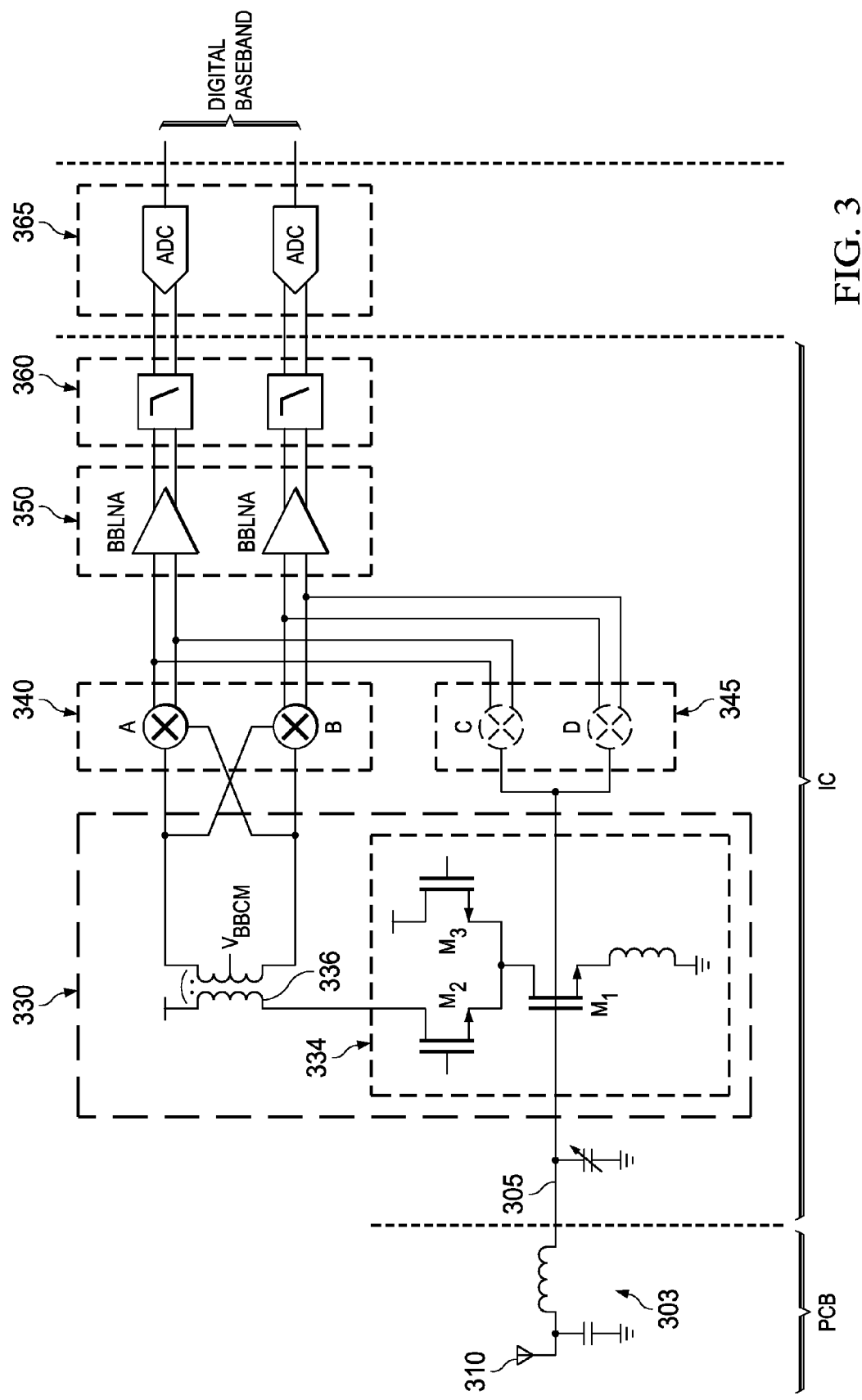
FIG. 3 comprises a circuit diagram of one example receiver in accordance with various embodiments of the invention.

A specific implementation is illustrated in FIG. 3. In this example, an input 305 configured to receive signals from an antenna 310. Receiving circuitry 320 is connected to the input 305. The receiving circuitry 330 has at least a wake-up mode configuration and a main radio mode configuration and is configured to use a same DC bias point in both configurations. The controller 280 is connected to the receiving circuitry 330 and configured to switch the receiving circuitry 330 between from the wake-up mode configuration to the main radio mode configuration based on signals received from the antenna 310. The configuration switch is executed by one or both of selectively changing a signal processing path for the receiving circuitry 320 and selectively configuring signal processing circuits of the receiving circuitry 320 when switching between the wake-up mode configuration and the main radio mode configuration.

In the example of FIG. 3, the signal processing path of the receiving circuity 330 in the main radio mode configuration includes a front end circuit 330 connected to the input 305 to receive the signals from the antenna 310 and output a front end output. The front end circuit 330 includes a front end low noise amplifier 334 and a center-tapped transformer 336. The center-tapped transformer 336 is configured to provide a bias voltage directly to the main downconversion mixer circuit 340. The main downconversion mixer circuit 340 is configured to convert the front end output from an RF carrier to baseband frequency to output a downconverted signal. A main baseband amplifier circuit 350 is connected to receive the downconverted signal and output a main baseband output to a baseband filter 360, which provides the resulting analog signal to an analog to digital conversion circuit 365 that converts the analog output from the receiving circuitry to a digital signal for use by the receiving device associated with the antenna 310.

In the wake-up mode configuration of the example of FIG. 3, the signal processing path includes a second downconversion mixer circuit 345 to directly convert information from an RF carrier frequency to a wake-up baseband frequency without amplification at carrier frequency. This saves current in the wake up mode, but also reduces sensitivity. The second downconversion mixer circuit 345 is different from the main downconversion mixer circuit 340. The main baseband amplifier circuit 350 is connected to receive the signals from the antenna 310 without passing through the front end circuit 330 or main downconversion mixer circuit 340. By using a same main baseband amplifier 350 and a same DC bias point for the main baseband amplifier 350 and low noise amplifier 334 when in both the wake-up mode and main radio mode configurations, the time needed for the circuits to make the switch between modes is reduced. Moreover, the re-routing of the signal can be executed through simple switching and turning off the switches M2 and M3 of the low noise amplifier 334, which takes switching times in the order of nanoseconds, an order of magnitude faster compared to the time constants achievable from the power management unit. For example, a switch of NMOS type can be easily implemented to bypass the low noise amplifier 334 but maintain the same DC bias point for the filters. Thereby, this approach has a faster mode switch time and uses a smaller footprint on the integrated circuit as compared to other wake-up approaches. Moreover, the benefit of this approach includes the fact that there is no current consumption from this gate bias voltage for an MOS transistor.

Figure 4:
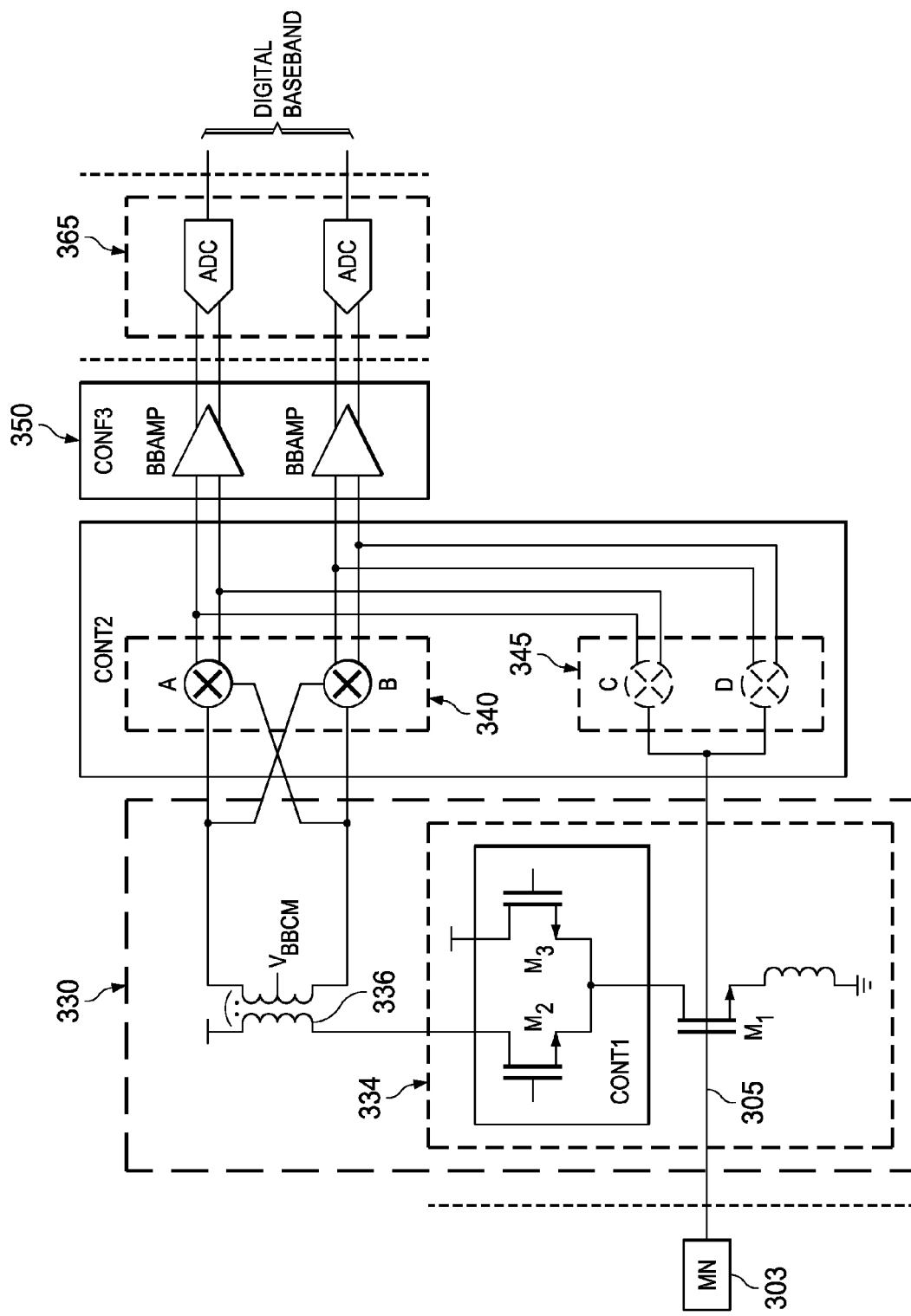
FIG. 4 comprises a circuit diagram illustrating example control blocks for the receiver of FIG. 3 as configured in accordance with various embodiments of the invention.

FIG. 4 illustrates various controlling modes and configuration modes for one example of programming the various blocks. Block CONT1 configures the low noise amplifier 334 to be in the OFF mode by programming only small transistors. In this approach, the controller turns off small switches at the gates of M2 and M3. Similarly, any of the mixer circuit 340 and 345 elements A, B, C, and D may be turned OFF by controlling a switch connected at the gate terminals in control block CONT2, which significantly reduces the turn-ON time for receiving a valid wake-up signal. The dynamic range of the architecture can be significantly changed by programming the baseband amplifier 350 from current mode implementation to voltage mode implementation as described below. The DC bias at the gate of transistor M1 is the same as that of the input bias of the baseband amplifier 350. This DC voltage is not changed between the main and the wake-up mode, thereby reducing the wakeup time significantly. The controller can be configured to provide same phase locked loop parameters when the receiving circuitry is operating in both the wake-up mode configuration and the main receiver mode configuration. In this way, the frequency synthesizer settings are also not changed, which saves significant time to enable the wakeup receiver and saves significant energy.

Figure 5:
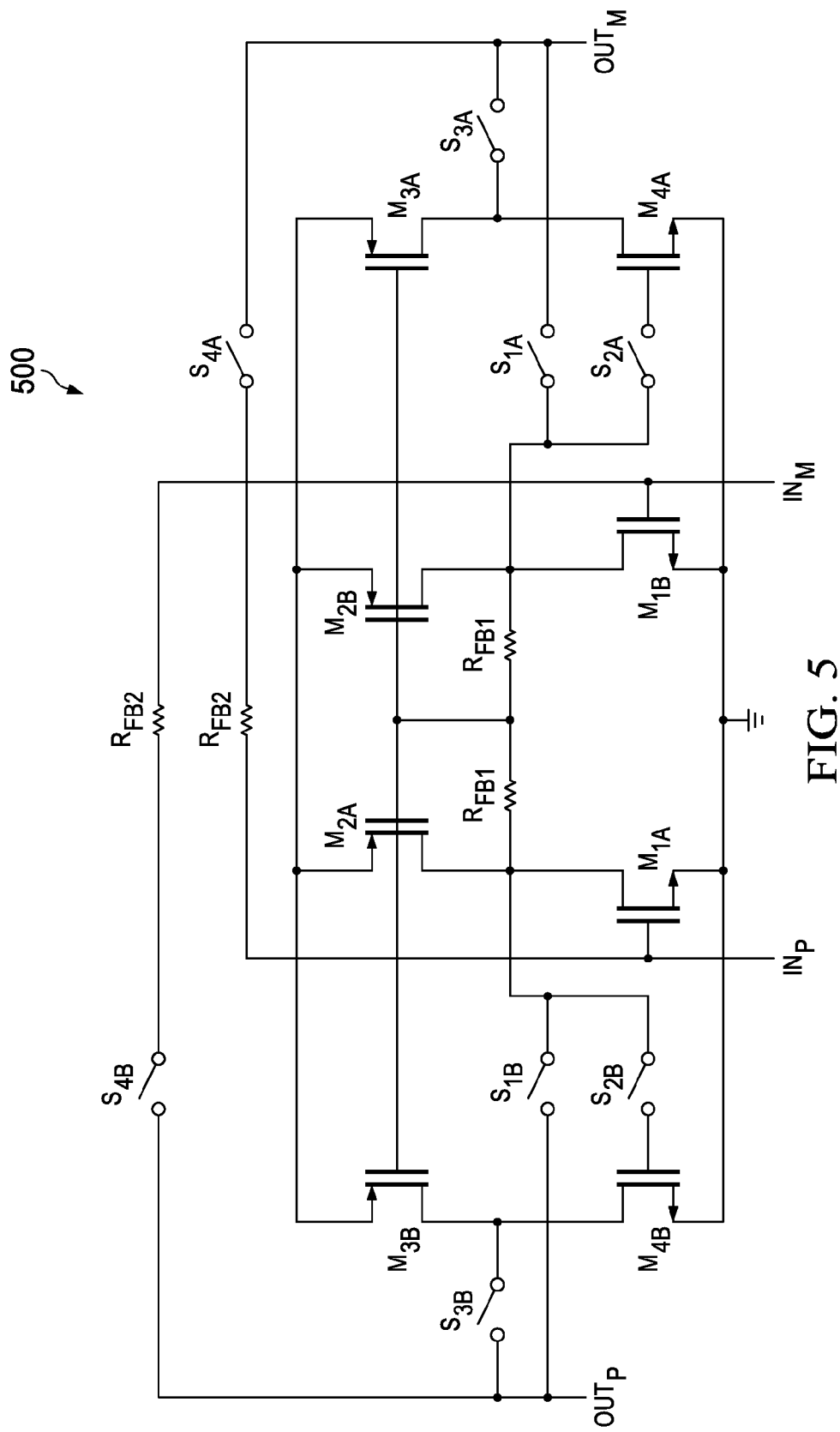
FIG. 5 comprises a circuit diagram of an example amplifier having two modes of operation configured in accordance with various embodiments of the invention.

In one approach to selectively configuring the receiving circuitry 330 when switching between the wake-up mode and main receiver mode configurations, the main baseband amplifier circuit 350 is configured between a main radio mode baseband amplifier circuit configuration used when the receiving circuitry 330 is in the main radio mode configuration and a wake-up mode baseband amplifier circuit configuration used when the receiving circuitry is in the wake-up mode configuration. One example configuration for a baseband amplifier circuit 500 able to switch between the two modes of operation is illustrated in FIG. 5. When in the wake-up mode baseband amplifier circuit configuration, the main baseband amplifier circuit 500 is configured to use a voltage mode baseband amplifier configuration configured for low voltage and low power. The voltage mode baseband amplifier is configured to use biasing voltage values at its input and output nodes to reduce switching time between the wakeup and main receiver mode. This amplifier uses a two stage active amplification topology with the first stage self-biased using large resistors $R_{FB1}$ and $R_{FB2}$, while the second stage consisting of transistors $M_{3A-B}$ and $M_{4A-B}$ requires a common mode feedback. All transistors are sized to obtain the maximum transconductance and output impedance at the bias current B. When switches $S_{1A-B}$ are closed and $S_{2A-B}$, $S_{3A-B}$, and $S_{4A-B}$ are opened, the amplifier circuit 500 is configured to be a single stage amplifier operating in voltage mode, saving current for the wake up receiver. During the wake up mode, a same DC voltage is held at the gate of the transistors Moa-B to avoid long time constant, and the two stages are DC compatible by design. Typical values would include $R_{FB1}$=200 kΩ, $R_{FB2}$=20-30 kΩ with $M_{2A-B}$ occupying up to 1 mm$^2$ and the rest of the transistors using ~15% of the area of the input stage. Thus, in the wake-up mode, the baseband filter becomes a single stage amplifier, providing about 20-24 dB small signal gain, and may operate from a typical 300-400 mV DC bias voltage and may operate down to 1V supply.

When in the main radio mode baseband amplifier circuit configuration, the main baseband amplifier circuit is configured to use a current mode baseband amplifier interface. In the example of FIG. 5, the main baseband amplifier circuit 5 includes a low noise amplifier circuit configured to switch between voltage mode and current mode configurations by opening and closing switches within the low noise amplifier; for example, when $S_{2A-B}$, $S_{3A-B}$, and $S_{4A-B}$ are closed and $S_{1A-B}$ are opened, the amplifier circuit 500 operates as a two stage high gain amplifier providing a low impedance to the mixers 340. In this mode, the biasing voltage values are typically 200-400 mV higher, and preferably 300-400 mV higher, than the ground rail for NMOS based mixers (element 340 implemented with NMOS transistors) and 200-400 mV lower, and preferably 300-400 mV lower, than the supply rail for PMOS based mixer (element 340 with PMOS based switches). In this example, the output DC voltage of the amplifier circuit 500 is set to near half the supply rail. $M_{1A-B}$ input stages may use lowest threshold voltage transistors in the technology or employ body biasing techniques to reduce threshold voltage to facilitate the common mode voltage requirement of the mixer at input and output nodes of the low noise amplifier set to reduce time for switching between the voltage mode and the current mode. In the illustrated example, the main baseband amplifier circuit comprises an NMOS based radio frequency amplifier. The NMOS transistor in the baseband amplifier may have a lower threshold voltage compared to the NMOS transistor used for the RF amplifier.

Figure 6:
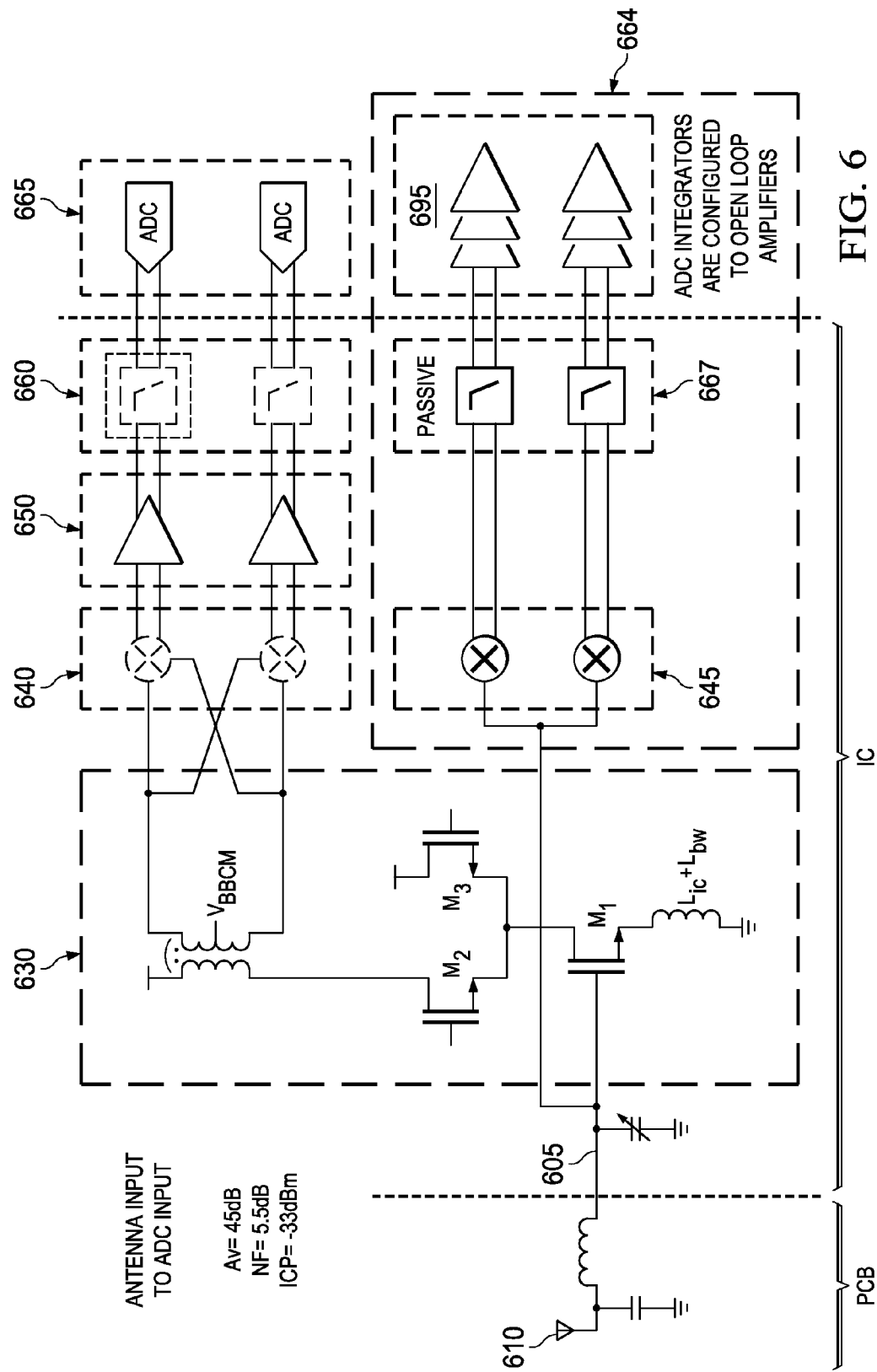
FIG. 6 comprises a circuit diagram of another example receiver configured in accordance with various embodiments of the invention.

In another approach, instead of using a same main baseband amplifier for both wake-up and main radio modes, the receiving circuitry can be configured to switch between two different amplifiers between the two modes, each amplifier using a same DC bias voltage, but being otherwise specifically configured to their respective wake-up and main radio tasks. One such approach is illustrated in FIG. 6. In this example, in the main radio mode configuration, the signal processing path includes a front end circuit 630 is connected to the input 605 to receive the signals from the antenna 610 and output a front end output. A main downconversion mixer circuit 640 converts the front end output from an RF carrier to baseband frequency to output a downconverted signal. A main baseband amplifier circuit 650 is connected to receive the downconverted signal and output a baseband output to an analog to digital converter circuit 665 that converts the analog output to a digital signal for use by the receiving device associated with the antenna 610.

In the wake-up mode configuration of this example, the signal processing path or receiving circuitry 664 includes a second low power, low dynamic range baseband amplifier circuit 695 different from the main baseband amplifier circuit 650 and connected to receive the signals from the antenna 610 without passing through the front end circuit 630. These amplifiers are designed to consume very limited current, offer limited bandwidth, and simply limit the signal at the output. These amplifiers are typically used to process the zero crossing information of the modulation and are usually suited for frequency or phase modulated signals. Hence, these amplifiers provide an energy efficient approach when the modulation of the detectable signal is performed by varying frequency or phase requiring no amplitude processing. This approach includes second mixer circuit 645 and anti-alias filter circuit 667 to process the signals from the antenna 610 in the wake-up mode configuration. In one example of this approach, one quadrature path of the receiving circuitry 664 is disabled when in the wake-up mode configuration, and the wake-up receiver is configured to operate in differential phase. In still another option, when in the wake-up mode configuration the receiving circuitry 664 is configured to operate in an asynchronous manner and without requiring a phase locked loop.

Figure 7:
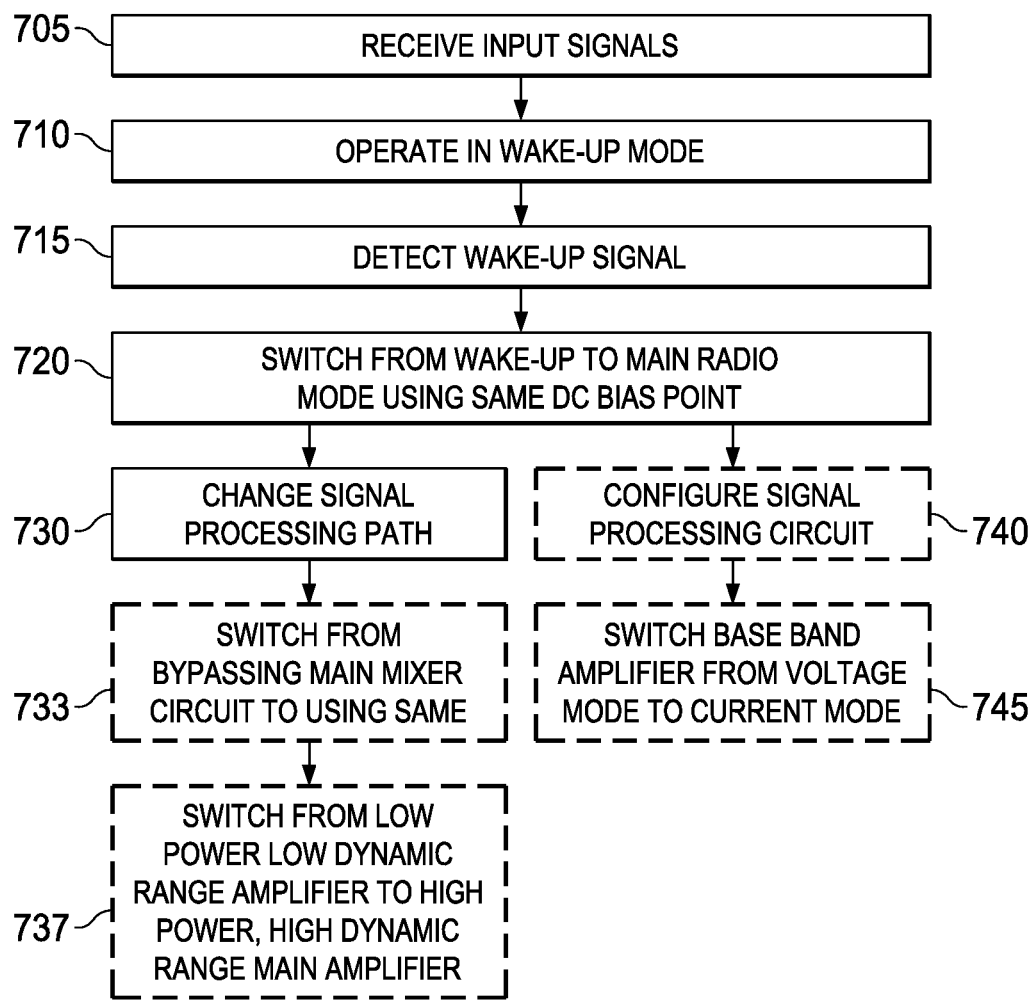
FIG. 7 comprises a flow diagram illustrating example methods of operation for a receiver configured in accordance with various embodiments of the invention.

An example method of operating a radio frequency receiver is illustrated in FIG. 7. First, input signals are received 705 from an antenna. Receiving circuitry of the radio frequency receiver operates 710 in a wake-up mode. While operating in the wake-up mode, a controller detects 715 a wakeup signal received by the radio frequency receiver. The method includes in response to receiving the wake up signal, switching 720 the radio frequency receiver from the wake-up mode to a main radio mode by one or both of selectively changing 730 a signal processing path for the receiving circuitry, and selectively configuring 740 signal processing circuits of the receiving circuitry. The receiving circuit uses a same DC bias point for the receiving circuitry in both the wake-up mode and the main radio mode and does not have to program it. By one approach, selectively changing the signal processing path for the receiving circuitry includes switching 733 from bypassing a main downconversion mixer circuit when operating in the wake-up mode to using the main downconversion mixer circuit when operating in the main radio mode. In another approach, selectively changing the signal processing path for the receiving circuitry comprises switching 737 from using a low power, low dynamic range baseband amplifier circuit different from a main baseband amplifier circuit and connected to receive the signals from the antenna without passing through a front end circuit when operating in the wake-up mode to using the main downconversion mixer circuit and the front end circuit when operating in the main radio mode.

With respect to configuring the signal processing circuits, in one example, selectively configuring signal processing circuits of the receiving circuitry includes switching 745 a baseband amplifier of the receiving circuitry from a voltage mode to a current mode. In this example, the baseband amplifier uses biasing voltage values at input and output nodes of the low noise amplifier set to reduce time for switching between the voltage mode and the current mode.

Those skilled in the art will recognize that a wide variety of modifications, alterations, and combinations can be made with respect to the above described embodiments without departing from the scope of the invention. For example, the receiving circuitry when operating in the main radio mode configuration may be configured to be calibrated by hardware that is physically separate from the receiving circuitry. Such modifications, alterations, and combinations are to be viewed as being within the ambient of the inventive concept.

What is claimed is:

1. An apparatus for a radio receiver, the apparatus comprising:
   an input configured to receive signals from an antenna;
   receiving circuitry connected to the input, wherein the receiving circuitry has at least a wake-up mode configuration and a main radio mode configuration; and
   a controller connected to the receiving circuitry and configured to switch the receiving circuitry between from the wake-up mode configuration to the main radio mode configuration based on signals received from the antenna;
   wherein the receiving circuitry is configured to use a same DC bias point in both the wake-up mode configuration and the main radio mode configuration and to one or both of:
   selectively change a signal processing path for the receiving circuitry, and
   selectively configure signal processing circuits of the receiving circuitry,
   when switching between the wake-up mode configuration and the main radio mode configuration;
   wherein in the main radio mode configuration, the signal processing path comprises:
      a front end circuit connected to the input to receive the signals from the antenna and output a front end output,
      a main downconversion mixer circuit to convert the front end output from an RF carrier to baseband frequency to output a downconverted signal;
      a main baseband amplifier circuit connected to receive the downconverted signal and output a main baseband output;
   wherein in the wake-up mode configuration, the signal processing path comprises:
      a second downconversion mixer circuit to convert information from an RF carrier frequency to a wake-up baseband frequency, the second downconversion mixer circuit different from the main downconversion mixer circuit; and
      the main baseband amplifier circuit connected to receive the signals from the antenna without passing through the front end circuit.

2. An apparatus for a radio receiver, the apparatus comprising:
   an input configured to receive signals from an antenna;
   receiving circuitry connected to the input, wherein the receiving circuitry has at least a wake-up mode configuration and a main radio mode configuration; and
   a controller connected to the receiving circuitry and configured to switch the receiving circuitry between from the wake-up mode configuration to the main radio mode configuration based on signals received from the antenna;
   wherein the receiving circuitry is configured to use a same DC bias point in both the wake-up mode configuration and the main radio mode configuration and to one or both of:
   selectively change a signal processing path for the receiving circuitry, and
   selectively configure signal processing circuits of the receiving circuitry,
   when switching between the wake-up mode configuration and the main radio mode configuration;
   wherein the receiving circuitry is configured to selectively configure the signal processing circuits by configuring the main baseband amplifier circuit between a main radio mode baseband amplifier circuit configuration used when the receiving circuitry is in the main radio mode configuration and a wake-up mode baseband amplifier circuit configuration used when the receiving circuitry is in the wake-up mode configuration;
   wherein when in the wake-up mode baseband amplifier circuit configuration, the main baseband amplifier circuit is configured to use a voltage mode baseband amplifier configuration configured for low voltage and low power.

3. The apparatus of claim 2 wherein when in the main radio mode baseband amplifier circuit configuration, the main baseband amplifier circuit is configured to use a current mode baseband amplifier interface.

4. The apparatus of claim 2 wherein the voltage mode baseband amplifier configuration is configured to use biasing voltage values at its input and output nodes to reduce switching time between the wakeup and main receiver mode.

5. An apparatus for a radio receiver, the apparatus comprising:
   an input configured to receive signals from an antenna;
   receiving circuitry connected to the input, wherein the receiving circuitry has at least a wake-up mode configuration and a main radio mode configuration; and
   a controller connected to the receiving circuitry and configured to switch the receiving circuitry between from the wake-up mode configuration to the main radio mode configuration based on signals received from the antenna;
   wherein the receiving circuitry is configured to use a same DC bias point in both the wake-up mode configuration and the main radio mode configuration and to one or both of:
   selectively change a signal processing path for the receiving circuitry, and
   selectively configure signal processing circuits of the receiving circuitry,
   when switching between the wake-up mode configuration and the main radio mode configuration;
   wherein the receiving circuitry is configured to selectively configure the signal processing circuits by configuring the main baseband amplifier circuit between a main radio mode baseband amplifier circuit configuration used when the receiving circuitry is in the main radio mode configuration and a wake-up mode baseband amplifier circuit configuration used when the receiving circuitry is in the wake-up mode configuration;
   wherein the main baseband amplifier circuit comprises a low noise amplifier configured to switch between voltage mode and current mode configurations by opening and closing switches within the low noise amplifier and having biasing voltage values at input and output nodes of the low noise amplifier set to reduce time for switching between the voltage mode and the current mode operations.

6. An apparatus for a radio receiver, the apparatus comprising:
   an input configured to receive signals from an antenna;

receiving circuitry connected to the input, wherein the receiving circuitry has at least a wake-up mode configuration and a main radio mode configuration; and a controller connected to the receiving circuitry and configured to switch the receiving circuitry between from the wake-up mode configuration to the main radio mode configuration based on signals received from the antenna;

wherein the receiving circuitry is configured to use a same DC bias point in both the wake-up mode configuration and the main radio mode configuration and to one or both of:

selectively change a signal processing path for the receiving circuitry, and selectively configure signal processing circuits of the receiving circuitry, when switching between the wake-up mode configuration and the main radio mode configuration;

wherein in the main radio mode configuration, the signal processing path comprises:

a front end circuit connected to the input to receive the signals from the antenna and output a front end output, a main downconversion mixer circuit to convert the front end output from an RF carrier to baseband frequency to output a downconverted signal;

a main baseband amplifier circuit connected to receive the downconverted signal and output a baseband output;

wherein in the wake-up mode configuration, the signal processing path comprises:

a second low power, low dynamic range baseband amplifier circuit different from the main baseband amplifier circuit and connected to receive the signals from the antenna, without passing through the front end circuit.

7. The apparatus of claim 6 wherein one quadrature path of the receiving circuitry is disabled when in the wake-up mode configuration, and the wake-up receiver is configured to operate in differential phase.

8. The apparatus of claim 6 where the receiving circuitry when in the wake-up mode configuration is configured to operate in an asynchronous manner and without requiring a phase locked loop.

9. A method of operating a radio frequency receiver, the method comprising:

receiving input signals from an antenna;

operating receiving circuitry of the radio frequency receiver in a wake-up mode;

while operating in the wake-up mode, detecting with a controller a wakeup signal received by the radio frequency receiver;

switching the radio frequency receiver from the wake-up mode to a main radio mode by one or both of:

selectively changing a signal processing path for the receiving circuitry, and selectively configuring signal processing circuits of the receiving circuitry; and using a same DC bias point for the receiving circuitry in both the wake-up mode and the main radio mode;

wherein the selectively configuring signal processing circuits of the receiving circuitry comprises switching a low noise amplifier of the receiving circuitry from a voltage mode to a current mode, wherein the low noise amplifier uses biasing voltage values at input and output nodes of the low noise amplifier set to reduce time for switching between the voltage mode and the current mode.

10. An apparatus comprising:

an input configured to receive signals from an antenna;

receiving circuitry connected to the input, wherein the receiving circuitry has at least a wake-up mode configuration and a main radio mode configuration; and a controller connected to the receiving circuitry and configured to switch the receiving circuitry between from the wake-up mode configuration to the main radio mode configuration based on signals received from the antenna;

wherein the receiving circuitry is configured to use a same DC bias point in both the wake-up mode configuration and the main radio mode configuration and to one or both of:

selectively change a signal processing path for the receiving circuitry, and selectively configure signal processing circuits of the receiving circuitry, when switching between the wake-up mode configuration and the main radio mode configuration;

wherein the receiving circuitry is configured to selectively configure the signal processing circuits by configuring the main baseband amplifier circuit between a main radio mode baseband amplifier circuit configuration used when the receiving circuitry is in the main radio mode configuration and a wake-up mode baseband amplifier circuit configuration used when the receiving circuitry is in the wake-up mode configuration;

wherein the main baseband amplifier circuit comprises a low noise amplifier configured to switch between voltage mode and current mode configurations by opening and closing switches within the low noise amplifier and having biasing voltage values at input and output nodes of the low noise amplifier set to reduce time for switching between the voltage mode and the current mode operations;

wherein when in the wake-up mode baseband amplifier circuit configuration, the main baseband amplifier circuit is configured to use a voltage mode baseband amplifier configuration configured for low voltage and low power by using biasing voltage values at its input and output nodes to reduce switching time between the wakeup and main receiver mode;

wherein when in the main radio mode baseband amplifier circuit configuration, the main baseband amplifier circuit is configured to use a current mode baseband amplifier interface.

11. The apparatus of claim 10 wherein in the main radio mode configuration, the signal processing path comprises:

a front end circuit connected to the input to receive the signals from the antenna and output a front end output and comprising a low noise amplifier;

and wherein the controller is configured to disable the low noise amplifier when switching the receiving circuitry from main radio mode configuration to the wake-up mode configuration.

12. The apparatus of claim 10 wherein the receiving circuitry when operating in the main radio mode configuration is configured to be calibrated by hardware that is physically separate from the receiving circuitry.

* * * * *